UNITED STATES PATENT OFFICE.

NATHAN ROSEWATER, OF CLEVELAND, OHIO.

DECAFFEINATED COFFEE.

1,016,293.  Specification of Letters Patent.  Patented Feb. 6, 1912.

No Drawing.   Application filed October 17, 1907.   Serial No. 397,804.

*To all whom it may concern:*

Be it known that I, NATHAN ROSEWATER, a citizen of the United States, residing at Cleveland, in the county of Cuyahoga and State of Ohio, have invented a certain new and useful Improvement in Decaffeinated Coffee and Processes of Producing the Same, of which the following is a full, clear, and exact description.

The primary object of this invention is to substantially eliminate caffein from coffee beans and to produce a product resembling the natural beans, but from which, after the same has been roasted and ground, one may make, by the usual methods, a coffee beverage which can scarcely be distinguished by its aroma and taste from that made from the ordinary roasted coffee bean commonly used for this purpose, but which, because the caffein that has been eliminated without the use of chemicals which are deleterious in a food product, is not inimical to health.

In carrying out the invention, the green beans are macerated in hot water. The temperature of the water and the time during which this step shall be carried on, and the number of times it should be repeated may be varied with the character of the coffee bean employed, and also with respect to the completeness with which it is desired to eliminate the caffein. The result of this treatment is that a very large percentage of the hot water soluble constituents of the bean will be dissolved. This being accomplished, the beans and the solution are segregated, and the beans are dried. Then this hot water extract is so treated as to remove from it those extractives, including caffein, which are not soluble in cold water. Practically the only extractive of any consequence in this hot water solution which is not also freely soluble in cold water is the caffein. This treatment may consist in merely allowing the solution or extract to get cold, although, by this method of procedure, all of the caffein will not be eliminated. The preferred method is to evaporate the extract to dryness, and to then put the dried residue into the cold water which will not dissolve the caffein to any appreciable degree, but will dissolve substantially all of the other ingredients of the hot water extract. This cold water solution containing all of the extractives which were removed by the hot water, excepting only substantially the caffein, is now poured over the dried beans from which they were extracted. These beans will absorb this extract. Thereafter the beans may be dried. The result will be that the beans will have had restored to them, but in positional relations quite different from such relations in the natural bean, but in unaltered chemical conditions all of those extractives or constituents which were removed by the hot water treatment, except such, including caffein, which cold water will not dissolve.

Example: A total of 101 pounds of equal proportions of Java, Mocha and Santos Rio green unbroken coffee beans are thoroughly mixed. If one pound of this mixture, taken as a sample, is finely ground and assayed for its caffein, the assay will show that about one per cent. of the mass is caffein, and that the total hot water soluble constituents, when dried at 212° F. are about 15 per cent. of the mass.

The remaining 100 pounds of the green whole beans are placed in a suitable containing vessel, to which is added about eleven hundred pints of water which is to be kept at a temperature of about 200° or 210° F. for about twelve hours, during which time the coffee is macerated in this hot water. At the end of this time the beans will have swollen and absorbed approximately one pint for every pound of beans, so that on straining and removing this macerating fluid, about one-thousand pints will be removed, which, when evaporated to dryness, will be found to have contained about 90 per cent. of the total hot water extractives of the beans, exclusive of the caffein. Only about one-tenth of the caffein in the beans will have been extracted by this maceration. The beans should thereafter be subjected several times to maceration in hot water under the same conditions and for about the same length of time. During each maceration about 90 per cent. of the remaining hot water soluble constituents will be removed, and about one-tenth of the original caffein. The first, and perhaps the second hot water extract, should be kept for future use. After the beans have been macerated in hot water as many times as is required to remove as much of the caffein as it is desired to remove, the beans will be removed from the water and dried. During the process of immersion in hot water the beans swell and become denuded of a delicate skin like covering which was practically destroyed by the hot water and the swelling.

The first extract (or perhaps commercially it will be found that the first two extracts may be profitably so treated) will then be evaporated to dryness, and the dried residue redissolved in cold water at a temperature of about 32 to 40 degrees, using somewhere about one-eighth of a pint of water for each pound of dry residue. Substantially all of the extractives which were removed by the hot water will be redissolved in this cold water, excepting only the caffein which will not be so dissolved in any appreciable quantity, if at all. The beans themselves having been dried are now immersed in this cold water extract, and they will absorb it, thus taking into and upon themselves the dissolved extractives which had been removed from them, excepting only those extractives which are insoluble in cold water. When the beans are now dried by evaporating the absorbed water, the extractives will be left therein, occupying different positional relations to the cellular compositions than the relations they occupied in the undried green bean; but they will largely still be there and will have suffered no chemical change during the practice of the process. These beans may now be roasted and ground, and a coffee extract for beverage may be prepared therefrom, just as from natural beans; except that the same may be prepared more readily than from untreated beans, because the extractives are in the superficial parts of the bean in greater proportion than in its depth and more readily dissolved out with heat. The resulting beverage will have all of the desirable taste and aroma of the beverage produced from the roasted and ground untreated natural beans.

It is to be noted that in the carrying out of this process, no chemical is used which, if allowed to remain in the product, will have any deleterious effect upon the health of the user. No chemical is used which can have produced any chemical change in the restored constituents. In all prior processes with which I am at all familiar chemicals are used during the treatment which, if not completely eliminated will render the product unsafe for use as a food; and the very fact that some part of such chemicals may be left in the product of itself renders the product open to suspicion, and therefore less desirable from a commercial view point at least. Moreover, the chemicals so employed in other processes do produce some chemical changes in the restored constituents, of the beans; and some of the substances resulting from such chemical changes are toxic or otherwise injurious to health.

While the hereinbefore described process, as defined by claims 1 and 2, is of greatest commercial value for the treatment of coffee beans, there are other natural beans which, after treatment of various sorts, are used for the making of beverages. The described process, as defined by said claims, is intended to include the treatment of such other beans as well as coffee beans.

Having described my invention, I claim:

1. The process of treating natural unbroken beans which contain caffein, which consists in the maceration of said beans in hot water only, in removing from the resultant extract those extractives (including caffein) which are substantially insoluble in very cold water, and in restoring to the beans in altered positional relations but in unaltered chemical composition all of those said extractives which are soluble in very cold water.

2. The process of treating natural unbroken beans which contain caffein, which consists in macerating said beans in hot water only; in segregating the resultant extract and the beans; in drying the latter; in evaporating the said extract to dryness; in forming a cold water solution of so much of the residue as will dissolve in very cold water; in causing the dried beans to absorb this cold water extract; and in finally drying said beans.

3. As a new article of manufacture, green denuded unbroken beans of the sort which originally contained caffein, but from which has been removed a large proportion of such of the constituents of said beans as are soluble in hot water, and which contain, in altered positional relation but in unaltered chemical composition, all of those ingredients which are not only soluble in hot water but are also soluble in very cold water.

In testimony whereof, I hereunto affix my signature in the presence of two witnesses.

NATHAN ROSEWATER.

Witnesses:
E. L. Thurston,
E. B. Gilchrist.